Patented Mar. 25, 1941

2,236,271

UNITED STATES PATENT OFFICE 2,236,271

METHOD OF PREPARING SHEET OR FILM MATERIAL

Edouard M. Kratz, Ogden Dunes, Ind., assignor to Marbon Corporation, a corporation of Delaware No Drawing. Application October 24, 1935, Serial No. 46,495

3 Claims. (Cl. 106—38)

This invention relates to a method of preparing sheet or film material for the manufacture of thin, transparent, flexible films or sheets free from impurities and pin holes for use in the wrapping and packaging of articles of various kinds.

More specifically this invention relates to a method of preparing sheet or film material for making transparent casein sheets free from impurities and from pin holes and which will not become brittle upon aging.

It is an object of this invention to provide a method of making sheet or film material having as its base a protein which is readily soluble in water or which may be rendered soluble by means of an alkaline or basic reacting substance, the sheet or film material being characterized by its thinness, clear and sparkling transparency, freeness from pin holes, lack of brittleness and by its toughness.

Another object of this invention is to provide a process for preparing sheet or film material composed of casein and free from brittleness.

A specific object of this invention is to remove impurities from commercial casein and to prepare a film forming material free from such impurities.

Other and further objects of this invention will become apparent from the following description and accompanying claims.

The base of the film or sheet material prepared according to this invention is a protein which is readily soluble in water or which may be rendered soluble by means of an alkaline or basic reacting substance. Examples of suitable proteins of this type are caseins, such as may be derived from milk, soya beans and other sources. It is known that the commercial form of such casein contains certain foreign ingredients, inherent in impurities in the form of dirt, mineral salts such as, for example, calcium acetate, calcium citrate, calcium chloride and calcium phosphate and other materials.

The first step in the process is the purification of the crude casein. Casein is an amphoteric substance having an isoelectric point of a pH value of 4.6. This means that casein forms salts with acids at any pH value numerically lower than 4.6 and also forms salts with bases at any pH value numerically greater than 4.6.

According to this invention the pH value of the casein is adjusted from 4.6 to 5.0 by adding an acid or a base as required, and is then washed with water in order to remove the resulting inorganic salts and any other readily water soluble impurities. It is not necessary to eliminate the calcium radical entirely if present in combination with casein as calcium caseinate. Thorough washing of the casein is very essential in order to remove all water soluble and crystalline substances, the present of which in the final sheet material would impart undesirable opacity thereto due to surface crystallization and upon aging would also render the sheet brittle.

After the casein has been properly washed with water and its pH adjusted to from 4.6 to 5.0, water is added in the proportion of from 6 to 7 parts of water to 1 part of casein by weight. The casein is dissolved with a suitable basic substance capable of reacting with the casein to form a water soluble compound. It has been found that various caustic alkalis, such as sodium, potassium and lithium hydroxides, ammonium hydroxide and various organic bases, such as alkylamines and hydroxyalkylamines are suitable for this purpose. As an organic base there may be used an alkylamine, such as the amylamines, ethylene diamine, butylamine and the like and a hydroxyalkylamine, such as ethanolamine, viz., triethanolamine, monoethanolamine, diethanolamine, or a mixture of the mono-, di- and tri-ethanolamines, or a polyethanolamine. The poly-ethanolamines are produced by the action of ethylene oxide on triethanolamine. A mixture of one or more of the ethanolamines and an alkali metal hydroxide is likewise satisfactory. A hydroxylamine may also be used.

Of the various basic substances mentioned above, it is preferred to use either caustic potash or triethanolamine or a mixture of the two. Caustic soda has a tendency to produce films that become brittle at higher humidities than do films prepared with caustic potash or an ethanolamine. These latter two basic substances produce films that resist the embrittling effect of low humidities. It is probable that triethanolamine has itself a slight plasticizing effect on the film.

The neutralization of the casein mass is carried out by the addition of the basic substance until the pH value of the solution remains constant at about 6.8, at which point the casein will all be in solution as a soluble caseinate. The casein may be made to dissolve at pH values below 6.8 but it is preferred to adjust the solution to this value because there is obtained a better reaction subsequently of the casein solution with formaldehyde when the pH value is at this point. The solution will also be satisfactory if the neutralization is continued to a pH value of from 7 to 7.5 but if this is done with the use of an ethanolamine, the final product will have an unpleasant taste, which is probably due to an excess of the ethanolamine. This taste is not so apparent when the pH value is kept below 7, and the product is very satisfactory when the value is about 6.8. For practical purposes, the lower pH limit may be taken as 6.5 and the upper pH limit as 7.5.

The amount of triethanolamine required to neutralize the casein to a pH value of 6.8 will vary between 8 and 14 parts per hundred parts of casein by weight depending upon the ash content of the casein used. The ash content represents the combined calcium.

Alternatively, commercial casein may be purified without the preliminary step of adjusting its pH value to between 4.6 and 5.0 and washing with water. If desired, the commercial casein may directly be treated with a basic substance to form a water soluble compound. Commercial casein is admixed with water in the proportion of from 6 to 7 parts of water to one part of casein by weight and the basic substance is added until the pH value of the solution remains constant at about 6.8 or until the pH value lies between 6.5 and 7.5. The amount of water added should be carefully regulated to prevent the formation of a too dilute solution which will dissolve the impurities in the casein. A concentration of 6 to 7 parts of water to one part of casein, viz., 12.5 to 15% casein, is desirable because at this concentration the salt impurities present in commercial casein will not dissolve. The solution is then filtered through a filter medium of sufficient fineness to prevent passage of the undissolved foreign particles, such as dirt or salt crystals therethrough.

If desired the alkaline casein solution prepared as described above, may be heated to temperatures between 130 and 142° F. and agitated preferably for from four to eight hours with a suitable filter aid such as diatomaceous earth, kieselguhr or the like. This period of contact between the casein solution and the filter aid gives a high degree of clarity to the solution necessary for making a highly transparent film free from specks and blemishes.

The alkaline solution with or without the filter aid can also be filtered under pressure to speed up the separation of the undissolved impurities and salt from the dissolved casein compound.

It has been found that commercial casein having an ash content (calcium) of 2½% or less gives a very satisfactory final product. Since the combined calcium acts as a base it is not necessary to use as much of the alkaline material in purifying the casein as would ordinarily be necessary. As much as 14 parts of triethanolamine may be required to neutralize a hundred parts of casein if the casein is substantially free from calcium. Equivalent reacting proportions of the other basic substances may be similarly employed to put the casein in solution and produce the desired pH of the resulting alkaline solution.

A plasticizer is next added to the filtered alkaline solution in an amount equal to from 5 to 30 percent, preferably 20 percent of the weight of casein (on a dry basis used). A hygroscopic liquid such as glycerine is desirable. Polyglycerols, water soluble glycols, such as ethylene or diethylene glycol, mono-ethyl or butyl ethers, diethylene glycol or mixtures thereof or a deliquescent salt, such as potassium acetate, may be used in place of all or part of the glycerine.

It has been found that mixtures of two or more of the above mentioned plasticizers may advantageously be employed. For instance, a mixture of diethylene glycol and glycerine in the proportions by weight of 1 part of diethylene glycol to 2 to 4 parts of glycerine gives satisfactory results. After adding the plasticizer, the viscosity of the solution is adjusted by addition of water to an arbitrary value found suitable for forming films or sheet material in accordance with known methods.

To the clarified and filtered solution there may be also added a number of emulsified substances for imparting certain properties to the finished sheet or film. Various natural or synthetic gums and resins, with or without waxes, mineral oil and the like can be added in the form of emulsions, but it has been found that chlorinated diphenyls with gum dammar, paraffin wax and a refined white mineral oil are particularly satisfactory.

Other resins such as gum rosin, and other gums such as elemi, may be employed.

Since the gums and resins are insoluble, it is necessary to use a dispersing or emulsifying agent. It is preferred to use, for this purpose, a mixture of alkali metal salts of organic sulphonic acids, such as, for example "Soap H." Soap H comprises purified and neutralized hydrocarbon sulphonic acids obtained as a by-product in the manufacture of "white" oils. Triethanolamine sulfonate can also be used as well as triethanolamine oleate or sulfonated castor oil.

Soap H or sulfonated castor oil may also be used without the addition of any resins or gums to give the solution better wetting action toward the surface on which the film forming solution is cast. The Soap H and sulfonated castor oil may be added either singly or together in amounts up to 15% by weight of the casein (dry basis). They have a slight plasticizing action in addition to their property of lowering the surface tension of the solution.

Before adding the resinous substances to the casein solution, they are preferably melted under heat. The following illustrates the preferred proportions but the invention is not to be construed as limited to the exact proportions shown, since obviously they may be varied:

| | Parts by weight |
|---|---|
| Gum dammar | 2½ |
| Chlorinated diphenyl | 2½ |
| Soap H | 5 |
| Cyclohexanol | 1 |

From 5 to 50%, but preferably about 11% of this melted mixture, based upon the dry weight of the casein used, is added to the casein solution. The Soap H may be replaced by other suitable emulsifying agents such as those discussed above.

The resinous mixture is poured into a small quantity of the casein solution kept at approximately 150 to 170° F. with constant agitation, and the resulting emulsion is then transferred to the main portion of the casein solution.

It is essential that the gums and resins be highly dispersed in order to obtain a clear film. To accomplish this, a large proportion of the emulsifying agent is necessary. It is preferred to use about one part of the emulsifying agent to one part of the mixture of resins or gums to be emulsified. Cyclohexanol is added to the mixture when Soap H is used because cyclohexanol has the property of assisting dispersions made with Soap H. Cyclohexanol may be replaced with other dispersing assistants such as methyl alcohol and may be also omitted when other emulsifying agents than Soap H are used.

The following example is given as an illustration of suitable proportion in forming the film material of my invention. The invention is not to be limited to these proportions and specific ingredients as other substances may be used and the proportions may be varied within considerable limits:

|  | Preferred | Broader range |
|---|---|---|
|  | Parts by weight | Parts by weight |
| Protein: Casein (purified) | 600 | 600 |
| Basic substance: Triethanolamine | 50 | 45 to 85 |
| Plasticizer: Glycerine | 120 | 30 to 180 |
| Gums and resins: |  |  |
| Chlorinated diphenyl | 15 | 0 to 150 |
| Gum dammar | 15 | 0 to 150 |
| Emulsifying agent: |  |  |
| Soap H | 30 | 0 to 300 |
| Hexalin (cyclohexanol) | 6 | 0 to 60 |

The combined effect of the gums, resins, and emulsifying agent is to give the film more body, greater brilliance, or sheen, greater strength and better resistance to low humidities. For example, if the washed casein be dissolved with sodium hydroxide, a film is obtained which becomes brittle at approximately 35% relative humidity. The combined effect of the resins and emulsifying agents will lower the brittle point to about 30% relative humidity, and when the preferred basic substances, potassium hydroxide or triethanolamine, are used as the dissolving agent for the casein, the resulting film will withstand relative humidities as low as 17 to 20% without becoming brittle.

In casting a composition such as described into sheets or films, a suitable insolubilizing agent, such as an aldehyde, or the like, is added. The effect of such an agent is to render the caseinate insoluble in water and to strengthen the film greatly. For this purpose, I prefer to use a 6% solution of formaldehyde in water. A stronger solution will tend to cause precipitation of the casein at the time the solutions are mixed. The preferred proportion for these solutions is about 1 part of the 6% formaldehyde solution to 25 parts by volume of the casein solution. Since this is more than sufficient formaldehyde to give the maximum insolubilizing action, lesser quantities of formaldehyde may therefore be used. The two solutions should be thoroughly mixed just before use and then promptly cast in continuous films or formed into sheets, since the mixture sets in a few minutes.

It is preferable to mix the solutions continuously in small quantities and immediately and continuously flow the mixture onto a suitable forming belt. A belt having a coating of cellulose nitrate will be satisfactory for this purpose.

After being cast onto the forming or carrier belt, the film on the belt is subjected to a drying operation by passing the belt through heated drier chambers, under controlled temperature and humidity conditions. The film is thereby dried and is then stripped from the carrier belt and wound into a roll in a continuous operation.

The reaction between the casein and organic amine is similar to that between casein and an alkali metal hydroxide and results in the formation of a caseinate of the particular organic amine used. This reaction product is soluble in water. The resinous substances added, however, such as a chlorinated diphenyl, dammar gum, or the like, are not water soluble but may be highly dispersed in the solution of the caseinate by means of suitable dispersing and emulsifying agents.

Chlorinated diphenyls may be used alone or in combination with gums, resins or waxes. Drying oils, such as linseed or tung oil, may also be incorporated into the composition.

The process of this invention therefore comprises the purification of a commercial protein material such as casein to remove impurities and salts such as calcium lactate, calcium citrate, calcium chloride and calcium phosphate and the like which crystallize and cause the film produced to become brittle and to develop pin holes. The purification of the commercial casein is effected by dissolving the casein with a basic material at a pH between 6.5 and 7.5 and at a concentration of casein sufficiently great to prevent the dissolving of the impurities and salts. A concentration of about 12.5 to 15% or more of the casein is desirable. The casein solution may be admixed with a filter aid and agitated preferable while heated to temperatures around 130 and 140° F. The addition of a filter aid, however, is not necessary. The solution is then filtered through any suitable filter medium which will retain the undissolved particles in the solution and the filtering operation may be effected under pressure to increase the speed of filtering.

The resulting clarified and filtered solution is then admixed with suitable plasticizers and gums as described above and may be directly fed to the casting machine for reacting with a hardening agent to produce the film or sheet material.

Having now described my invention, it is apparent that numerous details of the process may be varied through a wide range without departing from the principles of this invention and it is, therefore not purposed to limit the patent granted hereon otherwise than necessitated by the prior art.

I claim as my invention:

1. The method of making a composition suitable for the production of transparent, flexible sheets or films which comprises washing casein at a pH of 4.6 to 5.0 to free the casein from water soluble substances, reacting the purified casein in an aqueous medium with triethanolamine to form a solution of triethanolamine caseinate, filtering the solution and adding a plasticizer and an insolubilizing agent to said solution.

2. The improvement in the method of making a composition suitable for the production of a transparent, flexible sheet or film from crude casein, which comprises adjusting the pH value of the casein to 4.6 to 5.0, washing with water to remove resulting inorganic salts, reacting the washed casein in an aqueous medium with triethanol amine to form a solution of triethanol amine caseinate and adding a plasticizer to the solution.

3. The method of making a composition suitable for the production of sheets or films which comprises washing crude casein at a pH of 4.6 to 5.0 to free the casein from water soluble impurities, and reacting the purified casein in an aqueous medium with ethanol amine to form a solution of ethanol amine caseinate.

EDOUARD M. KRATZ.